(12) United States Patent
Chandran et al.

(10) Patent No.: US 12,284,130 B2
(45) Date of Patent: Apr. 22, 2025

(54) METHOD AND APPARATUS OPTIMIZING PHYSICAL DOWNLINK CONTROL CHANNEL DECODING IN A WIRELESS COMMUNICATION SYSTEM

(71) Applicant: SAMSUNG ELECTRONICS CO., LTD., Suwon-si (KR)

(72) Inventors: Ramesh Chandran, Bangalore (IN); Amarpreet Singh Sethi, Bangalore (IN); Prashanth Bedrala, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 352 days.

(21) Appl. No.: 17/885,254

(22) Filed: Aug. 10, 2022

(65) Prior Publication Data

US 2023/0062474 A1 Mar. 2, 2023

Related U.S. Application Data

(63) Continuation of application No. PCT/KR2022/011336, filed on Aug. 1, 2022.

(30) Foreign Application Priority Data

Aug. 17, 2021 (IN) .............................. 202141037304
Feb. 7, 2022 (IN) .............................. 202141037304

(51) Int. Cl.
*H04L 5/00* (2006.01)
(52) U.S. Cl.
CPC .................... *H04L 5/0051* (2013.01)
(58) Field of Classification Search
None
See application file for complete search history.

(56) References Cited

U.S. PATENT DOCUMENTS

2010/0279628 A1* 11/2010 Love .................. H04L 5/0091
455/70
2011/0201333 A1* 8/2011 Kwon .................. H04L 5/0091
455/434

(Continued)

FOREIGN PATENT DOCUMENTS

CN 102244885 11/2011
CN 113055124 A 6/2021

(Continued)

OTHER PUBLICATIONS

Indian Office Action issued Aug. 2, 2023 in corresponding Indian Patent Application No. 202141037304.

(Continued)

*Primary Examiner* — Faiyazkhan Ghafoerkhan
(74) *Attorney, Agent, or Firm* — NIXON & VANDERHYE P.C.

(57) ABSTRACT

Disclosed herein is method for optimizing Physical Downlink Control Channel (PDCCH) decoding by a base station in a wireless communication system. In an embodiment, a plurality of search spaces is configured within bandwidth of channel used for sending data packets to a user equipment (UE). Further, plurality of search spaces is ordered in a specified order, such that first end of specified order comprises search space set having higher number of candidates with lower aggregation levels and second end comprises search space set having higher number of candidates with higher aggregation levels. A channel quality indicator (CQI) value is received from UE and based on CQI value, an order for selecting one of plurality of search space set for sending downlink control information (DCI) to the UE is determined. An available search space set among determined one of plurality of search space set is selected for transmitting the DCI to the UE.

18 Claims, 11 Drawing Sheets

(56) References Cited

U.S. PATENT DOCUMENTS

| | | | | |
|---|---|---|---|---|
| 2011/0286413 A1* | 11/2011 | Nishio | ................. | H04J 11/0073 370/329 |
| 2013/0107816 A1* | 5/2013 | Iraji | ..................... | H04W 72/23 370/329 |
| 2013/0163543 A1* | 6/2013 | Freda | ................... | H04L 5/0092 370/329 |
| 2014/0133427 A1* | 5/2014 | Kim | ..................... | H04L 5/0053 370/329 |
| 2015/0117240 A1* | 4/2015 | Liang | ..................... | H04L 5/006 370/252 |
| 2015/0208391 A1* | 7/2015 | Park | ..................... | H04L 5/0094 370/329 |
| 2016/0226623 A1* | 8/2016 | Fröberg Olsson | .... | H04L 1/1812 |
| 2019/0223164 A1* | 7/2019 | He | ....................... | H04L 5/0053 |
| 2019/0297607 A1* | 9/2019 | Kim | ..................... | H04W 72/23 |
| 2019/0334681 A1* | 10/2019 | Xu | ....................... | H04L 1/0038 |
| 2019/0349911 A1* | 11/2019 | Seo | ...................... | H04W 72/23 |
| 2020/0245333 A1* | 7/2020 | Lin | ...................... | H04L 1/0026 |
| 2021/0067268 A1* | 3/2021 | Seo | ...................... | H04L 1/0052 |
| 2021/0144599 A1* | 5/2021 | Awoniyi-Oteri | ...... | H04L 5/0053 |
| 2022/0294578 A1* | 9/2022 | Kim | ...................... | H04L 5/0035 |
| 2023/0062474 A1* | 3/2023 | Chandran | ............. | H04L 5/0051 |

FOREIGN PATENT DOCUMENTS

| | | | |
|---|---|---|---|
| WO | 2015/140601 A1 | 9/2015 | |
| WO | 2019/233371 | 12/2019 | |
| WO | 2020/153809 | 7/2020 | |
| WO | WO-2020153809 A1 * | 7/2020 | ........... H04B 17/309 |
| WO | 2021/034086 A1 | 2/2021 | |

OTHER PUBLICATIONS

International Search Report mailed Nov. 4, 2022 issued in International Application No. PCT/KR2022/011336 (4 pages).
Written Opinion of the International Searching Authority mailed Nov. 4, 2022 issued in International Application No. PCT/KR2022/011336 (5 pages).
Extended European Search Report dated Oct. 28, 2024 for EP Application No. 22858636.8.

* cited by examiner

| Aggregation Levels | No. of candidates | Search space ID | Coreset #1 | Bandwidth Parts (BWP) |
|---|---|---|---|---|
| 1 | 0 | SS1 | | |
| 2 | 0 | | | |
| 4 | 0 | | | |
| 8 | 6 | | | |
| 16 | 8 | | | |
| 1 | | SS2 | | |
| 2 | | | | |
| 4 | | | | |
| 8 | 4 | | | |
| 16 | 6 | | | |
| 1 | | SS3 | | |
| 2 | 6 | | | |
| 4 | 4 | | | |
| 8 | 2 | | | |
| 16 | | | | |
| 1 | 6 | SS4 | | |
| 2 | 2 | | | |
| 4 | | | | |
| 8 | | | | |
| 16 | | | | |

METHOD AND APPARATUS OPTIMIZING PHYSICAL DOWNLINK CONTROL CHANNEL DECODING IN A WIRELESS COMMUNICATION SYSTEM

CROSS-REFERENCE TO RELATED APPLICATIONS

This application is a continuation of International Application No. PCT/KR2022/011336, designating the United States, filed on Aug. 1, 2022, in the Korean Intellectual Property Receiving Office and claiming priority to Indian Provisional Patent Application No. 202141037304, filed on Aug. 17, 2021, in the Indian Patent Office, and to Indian Complete Patent Application No. 202141037304, filed on Feb. 7, 2022, in the Indian Patent Office, the disclosures of each of which are incorporated by reference herein in their entireties.

BACKGROUND

Field

The disclosure relates to a method and apparatus for physical downlink control channel (PDCCH) decoding in a wireless communication system.

Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5 G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

PDCCH is used to carry a Downlink Control Information (DCI) message. Generally, the DCI message indicates the downlink and uplink resources for the Physical Downlink Shared Control Channel (PDSCH) or Physical Uplink Shared Control Channel (PUSCH). The PDCCH carries the control information for both PDSCH and PUSCH. A User Equipment (UE) finds the PDCCH specific to it by monitoring a set of PDCCH candidates in every sub-frame. The UE further uses a Radio Network Temporary Identifier (RNTI) to try and decode the candidates. The decoding of PDCCH will enable the UE to read the DCI message for scheduling the resource allocation to the UE on the PDSCH and PUSCH.

According to the 5G New Radio (5G/NR) standard, a cell has multiple search space sets specifically defined for each type of UEs. Each search space set in the 5G NR can be uniquely mapped to a Control Resource Set (CORESET). An ID of each search space is unique among Bandwidth Parts (BWP) of a serving cell. The search space defines how and where to search for PDCCH candidates. The search space configuration uses CORESET to define the specific Resource Block (RB) and symbol where UE can attempt to decode the PDCCH. It also informs how many PDCCH candidates are present at each Aggregation level (AL) that UE shall try to decode. Whereas, in 4G standard, there is not much flexibility in defining the number of candidates for the aggregation level. Also, in 4G, only a fixed number of candidates are allowed in the aggregation level. The time location is informed within the slot where the CORESET is applied.

Indeed, every search space set can be configured with multiple aggregation levels. The UE can be configured with multiple search space sets up to a value 10 in a cell. Whereas, in 4G only a single search space set is configured with the UE. In the 5G/NR system, the entire bandwidth is divided into the multiple uplink and downlink parts. Further, the CORESET, which is a set of physical resources, can be used to carry the PDCCH or the DCI message. The CORESET includes $N_{RB}^{CORESET}$ resource blocks in the frequency domain, and $N_{symb}^{CORESET} \in \{1,2,3\}$ symbols in the time domain. As an example, 3 CORESET can be configured for an active DL Bandwidth Parts ($BWP_1$, $BWP_2$ ... and so on). However, this should not be construed as a limitation, as it may be possible to configure more than three CORESET for an active DL. Further, each CORESET includes multiple search space sets ($SS_1$, $SS_2$ ... and so on), which may further include of multiple Control Channel Elements (CCEs: $CCE_0$, $CCE_1$ ... $CCE_{n-1}$). The multiple CCEs can be combined together to form an aggregation level.

Each 5G cell has multiple search space sets. Further each of search space sets can be assigned with multiple aggregation levels which may further comprise multiple number of candidates. Finally, the UE may perform a blind DCI decoding in the multiple number of candidates in the search space set. It is observed from that each search space set has multiple potential PDCCH candidates per aggregation level for the UE. The aggregation level is chosen based on the Channel Quality Indicator (CQI) which is measure of interference and received signal power level. Also, it is observed that, a UE that reports lower CQI is allocated with higher aggregation level and the UE blindly decodes all the configured search spaces for determining the DCI information, which is a computationally intensive operation and results in consuming more power of the UE.

Moreover, the 3GPP specification does not define the order of PDCCH decoding across multiple search space sets configured for a 5G/NR UE. Since in 5G/NR there are multiple search space sets configured for UE, which have the same aggregation level or there may be multiple aggregation levels for each search space set, the UE has to search across all the configured search space sets and across all the aggregation levels in search space set for performing the decoding. This blind decoding process performed by the UE is computationally intensive and consumes more power of the UE. In addition, there is also a constraint on the maximum number of PDCCH candidates that a UE can search in a given slot. Thus, there is a need for an optimal decoding logic to be defined to efficiently decode the PDCCH information.

One of the existing approaches disclosed in WO2019233371A1, suggests that the base station determines a correspondence between the aggregation level and channel quality and sends it to the UE using a system message. The UE further uses this correspondence to choose the aggregation level based on the detected downlink channel quality. However, in this conventional technique, there is a dependency between the base station and the UE.

Another existing approach disclosed in US20190223164A1 suggests that the priority of the PDCCH candidate can be based on the aggregation level. However, this technique does not teach, on what basis the priority will be defined.

CN102244885A proposes yet another approach, in which the LTE system provides a method for UE to automatically determine best aggregation level based on Downlink (DL) channel quality. However, the LTE does not have the concept of multiple search space sets for a UE as in that of 5G systems.

The information disclosed in this background of the disclosure section is to aid in understanding of the general background of the disclosure and should not be taken as an acknowledgement or any form of suggestion that this information forms the prior art already known to a person skilled in the art.

SUMMARY

Embodiments of the disclosure provide a method and apparatus for optimizing Physical Downlink Control Channel (PDCCH) decoding in a 5G telecommunication network.

According to an example embodiment, a method provided by the disclosure comprises: transmitting, by a base station, configuration information including information about a plurality of search space sets within a bandwidth of a channel used for sending data packets to a user equipment (UE; ordering, by the base station, the plurality of search space sets in a specified order for the plurality of search space sets based on a number of physical downlink control channel (PDCCH) candidates per aggregation level in each search space set; receiving a channel quality indicator (CQI) value, corresponding to the channel from the UE; determining an order for selecting one of the plurality of search space set for sending downlink control information (DCI) required for decoding a PDCCH to the UE based on the CQI value; and selecting an available search space set among the determined one of the plurality of search space sets for transmitting the DCI to the UE.

According to an example embodiment, the present disclosure relates to a base station in a wireless communication system. The base station comprises: a transceiver and a processor. The processor is configured to: transmit, through the transceiver, configuration information including information about a plurality of search space sets within a bandwidth of a channel used for sending data packets to a user equipment (UE; order the plurality of search space sets in a specified order for the plurality of search space sets based on a number of physical downlink control channel (PDCCH) candidates per aggregation level in each search space set; receive, through the transceiver, a channel quality indicator (CQI) value, corresponding to the channel, from the UE; determine an order for selecting one of the plurality of the search space sets for sending downlink control information (DCI) required for decoding a PDCCH to the UE based on the CQI value; and select an available search space set among the determined one of the plurality of search space sets for transmitting the DCI to the UE.

According to an example embodiment, disclosed herein is method for optimizing physical downlink control channel (PDCCH) decoding by a user equipment (UE) in a wireless communication system. The method comprises: receiving, by the UE, configuration information including information about a plurality of search space sets within a bandwidth of a channel used for receiving data packets from a base station; determining, by the UE, a channel quality indicator (CQI) value corresponding to the channel and transmitting the CQI value to the base station; and detecting downlink control information (DCI) on a PDCCH by searching the plurality of search space sets in a specified order configured based on a number of PDCCH candidates per aggregation level in each search space set.

According to an example embodiment, the present disclosure relates to user equipment (UE) configured to optimize physical downlink control channel (PDCCH) decoding in a wireless communication system. The UE comprises: a transceiver and a processor. The processor is configured to: receive, through the transceiver, configuration information including information about a plurality of search space sets within a bandwidth of a channel used for receiving data packets from a base station; determine a channel quality indicator (CQI) value corresponding to the channel and transmitting the CQI value to the base station; and detect downlink control information (DCI) on a PDCCH by searching the plurality of search space sets in a specified order configured based on a number of PDCCH candidates per aggregation level in each search space set.

Wherein the specified order comprises at least one of a first end in which a search space set having higher number of PDCCH candidates with lower aggregation levels and a second end of the specified order comprises a search space set having higher number of PDCCH candidates with higher aggregation levels.

Wherein the plurality of search space sets are ordered in the specified order wherein the number of PDCCH candidates per the aggregation level is allocated more to lower aggregation levels for a channel condition having the CQI value greater than a specified threshold CQI value.

Wherein the plurality of search space sets are ordered in the specified order wherein the number of PDCCH candidates per the aggregation level is allocated more to higher aggregation levels for a channel condition having the CQI value less than a specified threshold CQI value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 6 is a diagram illustrating an example ordered combination of aggregation levels and corresponding PDCCH candidates for multiple search space sets, according to various embodiments.

Figure 1A:
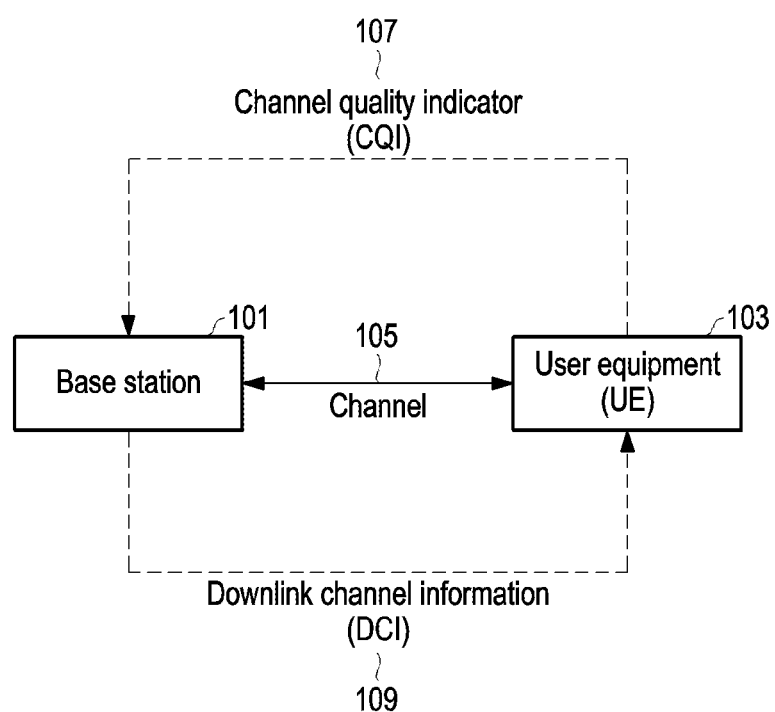
FIG. 1A is a diagram illustrating example communication between a base station and a User Equipment (UE) according to various embodiments.

It should be appreciated by those skilled in the art that the diagrams herein represent conceptual views of illustrative systems embodying the principles of the present subject matter. Similarly, it will be appreciated that any flowcharts, flow diagrams, state transition diagrams, pseudo code, and the like represent various example processes which may be substantially represented in computer readable medium and executed by a computer or processor, whether such computer or processor is explicitly shown.

DETAILED DESCRIPTION

In the disclosure, the word "exemplary" may refer, for example, to "serving as an example, instance, or illustration." Any embodiment or implementation of the present disclosure matter described herein as "exemplary" is not necessarily to be construed as preferred or advantageous over other embodiments.

While the disclosure is susceptible to various modifications and alternative forms, various embodiments thereof has been shown by way of example in the drawings and will be described in greater detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a, device, or method that comprises a list of components or steps does not include only those components or steps but may include other components or steps not expressly listed or inherent to such device or method. In other words, one or more elements in a system or apparatus proceeded by "comprises . . . a" does not, without more constraints, preclude the existence of other elements or additional elements in the system or method.

It is to be understood that the singular forms "a," "an," and "the" include plural referents unless the context clearly dictates otherwise. Thus, for example, reference to "a component surface" includes reference to one or more of such surfaces. "/" represents "and/or", for example, "first/second node" represents the first node and the second node, or the first node or the second node.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, element, component or a combination thereof, but may not be construed to exclude the existence of or a possibility of addition of one or more other characteristics, numbers, steps, operations, elements, components or combinations thereof.

The term "or" used in various embodiments of the present disclosure includes any or all of combinations of listed words. For example, the expression "A or B" may include A, may include B, or may include both A and B.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operations are performed over the computer or other programmable data processing devices and operate the computer or other programmable data processing devices may provide operations for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" may refer, for example, to a software element or a hardware element, such as a field-programmable gate array (FPGA) or an application specific integrated circuit (ASIC). A unit plays a certain role. However, the term "unit" is not limited to a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more central processing units (CPUs) in a device or a security multimedia card. According to embodiments of the disclosure, a " . . . unit" may include one or more processors.

Hereinafter, the disclosure is described in greater detail below with reference to the accompanying drawings. When determined to make the subject matter of the disclosure unclear, the detailed of the known functions or configurations may be omitted. The terms as used herein are defined considering the functions in the disclosure and may be replaced with other terms according to the intention or practice of the user or operator. Therefore, the terms should be defined based on the overall disclosure. Hereinafter, the base station may be an entity allocating resource to a terminal and may be at least one of a gNode B (gNB), an eNode B, a Node B, a base station (BS), a wireless access unit, a base station controller, or a node over network. The base station may be a network entity including at least one of an integrated access and backhaul-donor (IAB-donor), which is a gNB providing network access to UE(s) through a network of backhaul and access links in the 5G system, and an IAB-node, which is a radio access network (RAN) node supporting NR backhaul links to the IAB-donor or another IAB-node and supporting NR access link(s) to UE(s). The UE is wirelessly connected through the IAB-node and may transmit/receive data to and from the IAB-donor connected with at least one IAB-node through the backhaul link. The UE may include a terminal, a mobile station (MS), a cellular phone, a smartphone, a computer, or a multimedia system capable of performing communication functions. Of course, it is not limited to the above examples. Described below is a technology for receiving broadcast information from a base station by a UE in a wireless communication system.

The disclosure relates to a method for optimizing Physical Downlink Control Channel (PDCCH) decoding in a 5G telecommunication network. In an embodiment, the disclosed method configures a plurality of search spaces within bandwidth of a channel used for sending data packets to a User Equipment (UE). Further, the method orders the plurality of search spaces in a predefined (e.g., specified) order, such that a first end of the predefined order comprises a search space set having higher number of candidates with lower aggregation levels and a second end of the predefined order comprises a search space set having higher number of candidates with higher aggregation levels. Further, a Channel Quality Indicator (CQI) value is received from the UE and based on the CQI value, an order for selecting one of the plurality of search space set is determined for sending a Downlink Control Information (DCI) required for decoding the PDCCH to the UE based on the CQI value. In an embodiment, an available search space set is selected among one of the determined plurality of search space set for transmitting the DCI to the UE.

In the following detailed description, reference is made to the accompanying drawings that form a part hereof, and in which are shown by way of illustration various example embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A is a diagram illustrating an example of communication between a base station and a User Equipment (UE), according to various embodiments.

In an embodiment, a base station 101 may be associated with a plurality of search spaces in a predefined (e.g., specified) order. The first end of the predefined order may comprise a search space set having higher number of candidates with lower aggregation levels. On the other hand, a second end of the predefined order may comprise a search space set having higher number of candidates with higher aggregation levels. In an embodiment, the base station may receive a Channel Quality Indicator (CQI) 107 value corresponding to a communication channel 105 between the base station 101 and the UE 103 from the UE 103. Based on the CQI 107 value received by the base station, the base station 101 may determine the order for selecting one of the plurality of search space set for sending a Downlink Control Information (DCI) 109 to the UE 103. In an embodiment, the DCI 109 may be the information required for decoding the PDCCH to the UE 103. Thereafter, the base station 101 selects an available search space set among the plurality of search space set for transmitting the DCI 109 to the UE 103. In an embodiment, the UE 103 may include, without limiting to, a mobile phone, a smartphone, a laptop and/or any other computing device capable of being connected to a telecommunication network.

In an embodiment, the UE 103 may comprise a configuration of a plurality of search spaces within bandwidth of the channel 105 used for receiving the data packets from the base station 101. The CQI 107 value corresponding to the channel 105 may be transmitted to the base station 101 by the UE 103. Further, the UE 103 may retrieve the DCI 109 message from the base station 101 after searching the plurality of search spaces in the predefined search order.

In an embodiment, the process of searching the predefined search order may comprise searching the first end of the plurality of search spaces with higher number of candidates and with lower aggregation levels when the CQI 107 value is higher than a predefined threshold CQI 107 value. The searching may comprise searching a second end of the plurality of search spaces having higher number of candidates with higher aggregation levels when the CQI 107 value is less than the predefined threshold CQI 107 value.

Figure 1B:
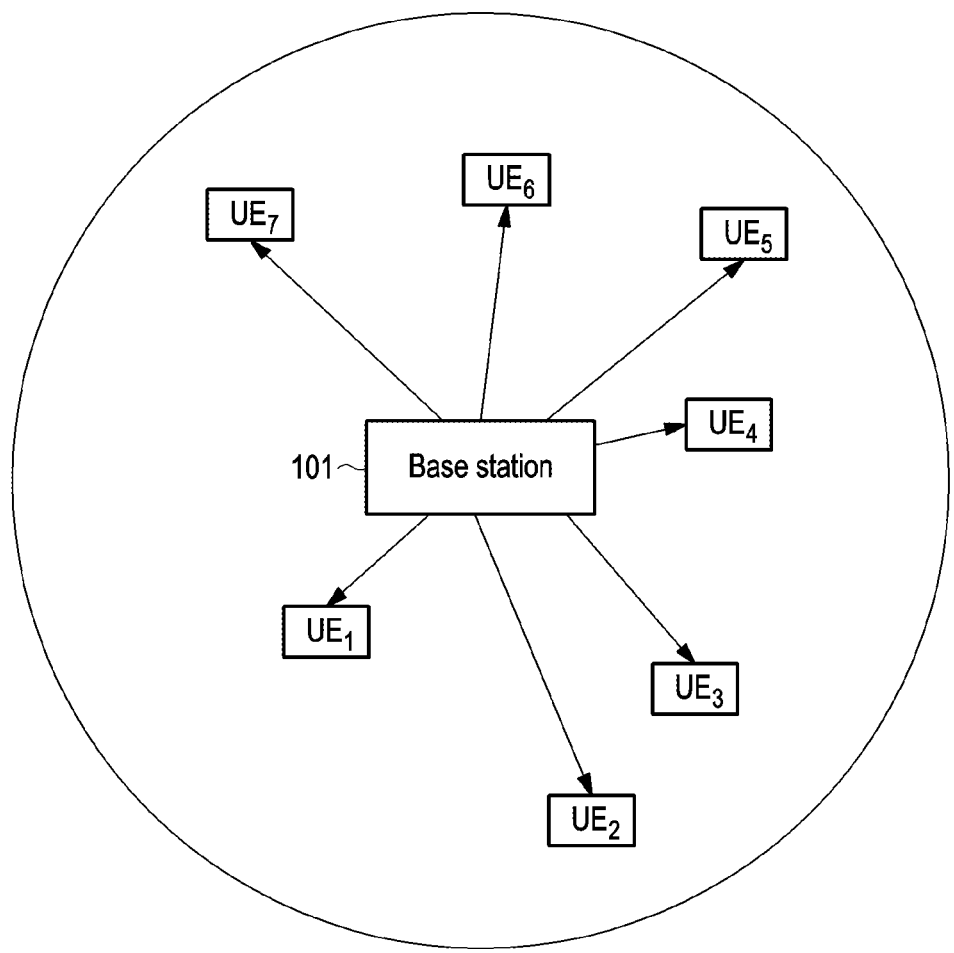
FIG. 1B and FIG. 1C are diagrams illustrating examples of a UE decoding the PDCCH search space based on the channel conditions, according to various embodiments.

FIG. 1B is a diagram illustrating an example base station 101 choosing an appropriate search space set for transmitting DCI 109 based on the UE 103 channel 105 conditions, according to various embodiments. In an embodiment, the base station 101 may choose the appropriate search space set for transmitting the DCI 109 based on the channel 105 conditions of the UE 103, that is, the CQI value returned by the UE 103. In a 5G telecommunication system, there may be multiple UEs, namely $UE_1$ $103_1$, $UE_N$ $103_N$, that are associated with the base station 101 over a communication channel Each UE 103 may have a respective and different channel condition with the base station.

In an embodiment, the base station 101 may choose an appropriate search space set based on the downlink channel conditions experienced by the UE 103 while it is connected to the base station. The present disclosure discloses a mechanism to be implemented at the base station 101, which includes configuring multiple ordered PDCCH search space sets and choosing an appropriate search space set to transmit the DCI 109 to the UE 103 using the CQI 107 value reported by the UE. In other words, the CQI 107 value is used to determine the order of search across multiple ordered search space sets. Thus, the base station 101 has the flexibility to choose the most appropriate search space set for transmitting the DCI 109 based on the channel condition of the UE 103.

Figure 1C:
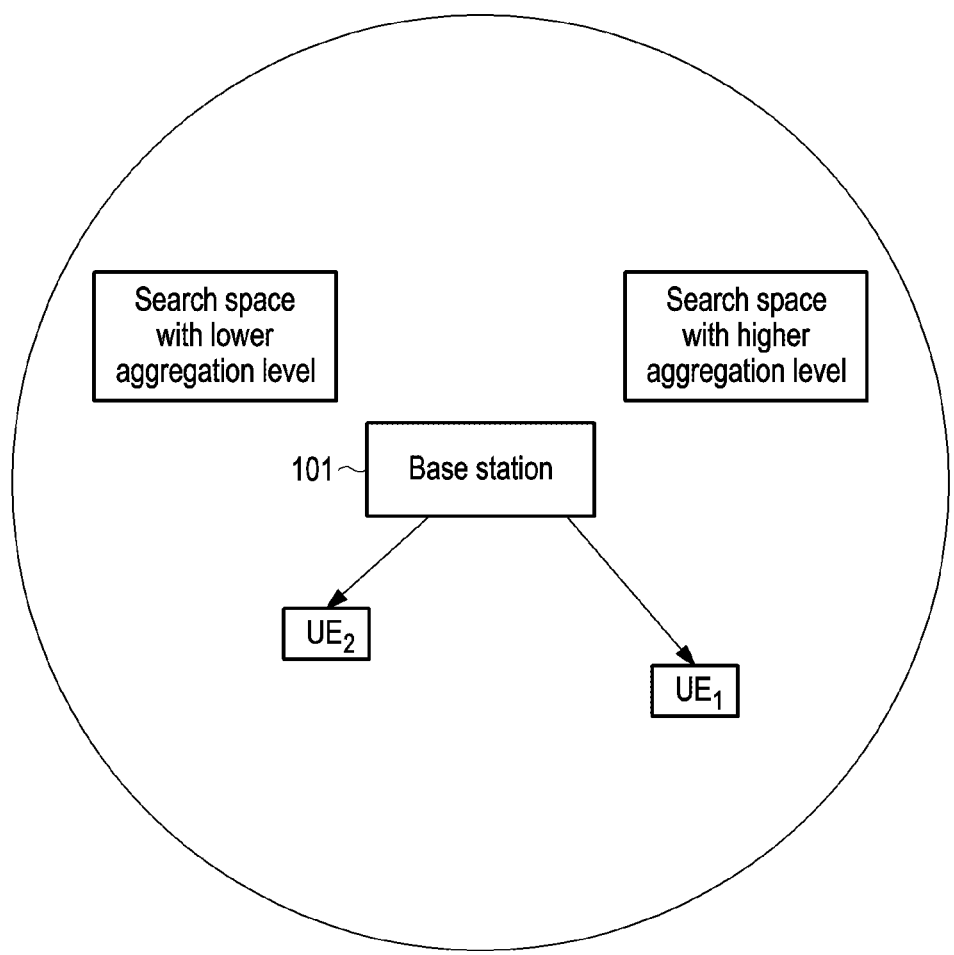

FIG. 1C is a diagram illustrating an example of a UE 103 decoding the PDCCH search space based on the channel conditions, according to various embodiments.

In an embodiment, the UE 103 decodes the PDCCH search space order based on the channel conditions, in accordance with various embodiments of the present disclosure. The method for PDCCH decoding performed by the UE 103 includes prioritizing the decoding order of search space candidates as per the downlink channel conditions, which in turn reduces the PDCCH decoding time in order to save the power cycles at the UE 103. This is achieved due to better decoding of the PDCCH based on the Aggregation Level (AL), as per the channel conditions.

As an example, as shown in FIG. 1C, suppose the $UE_1$ is away from the base station 101. In this case, the CQI 107 value sent to the base station 101 by the $UE_1$ may be less than the predefined threshold CQI value. Consequently, the base station 101 may choose a second end of the search order, which has a higher number of candidates with higher aggregation level. This, in turn, reduces the PDCCH decoding time for the $UE_1$, and thereby saves the power cycles at the $UE_1$.

In an embodiment, suppose the $UE_2$ is closer to the base station 101 and the CQI 107 value sent by $UE_2$ to the base station 101 is higher than the predefined threshold. In this case, the base station 101 may select a first end of the search order, which comprises a plurality of search spaces having higher number of candidates with lower aggregation levels. This, in turn, reduces the PDCCH decoding time for $UE_2$ and saves the power cycles at the $UE_2$.

Figure 2A:
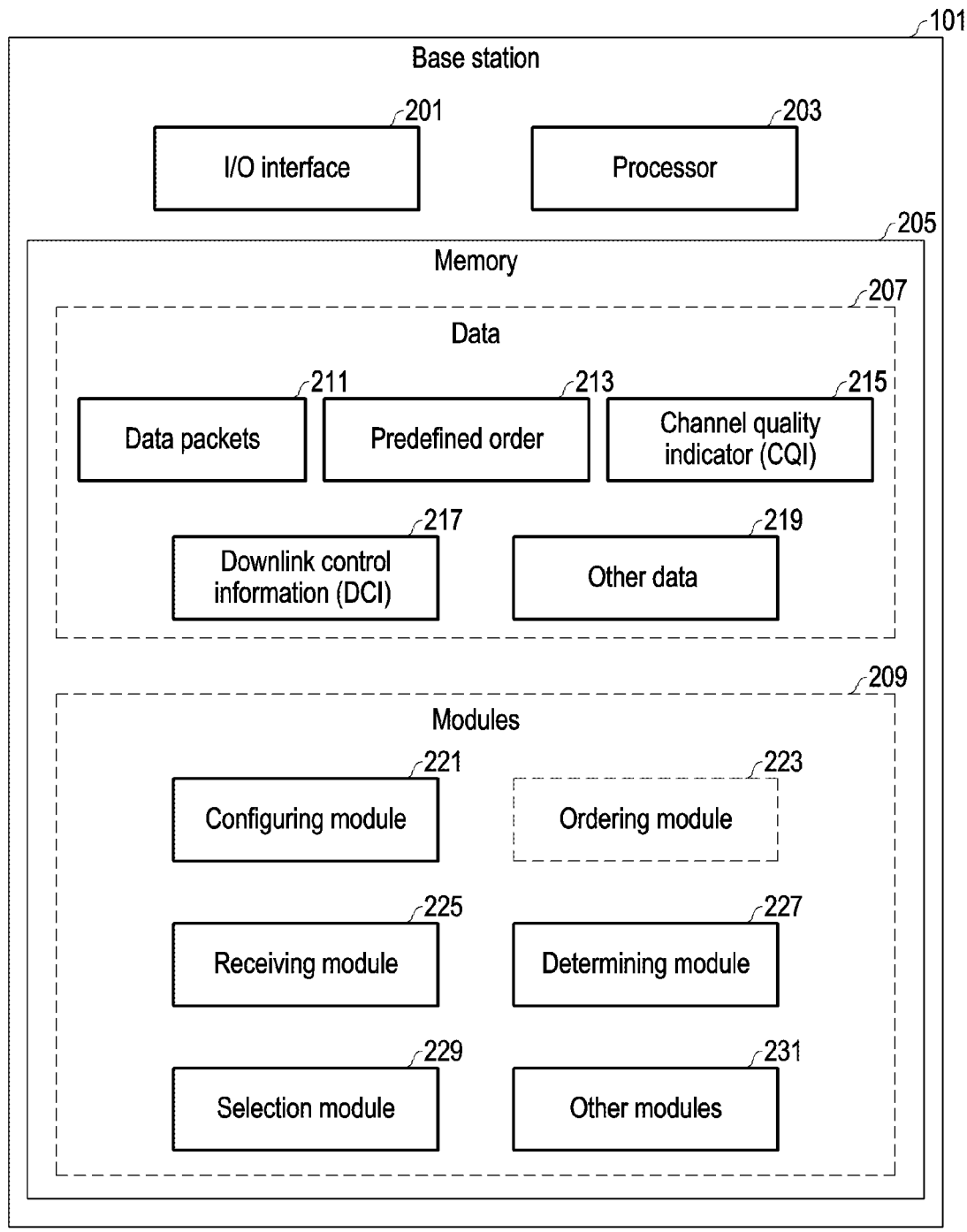
FIG. 2A is a block diagram illustrating an example configuration of a base station, according to various embodiments.

FIG. 2A is a block diagram illustrating an example configuration of a base station, according to various embodiments.

In an embodiment, the base station 101 may include an I/O interface (e.g., including I/O circuitry) 201, a processor (e.g., including processing circuitry) 203 and a memory 205. The I/O interface 201 may be used for receiving one or more user inputs from a manager of the base station 101. The processor 203 may be configured to perform one or more functions of the base station 101 for optimizing Physical Downlink Control Channel (PDCCH) decoding in a 5G telecommunication network, using the data 207 and the one or more modules (e.g., including various processing circuitry and/or executable program instructions) 209 in stored in a memory 205 of the base station. In an embodiment, the memory 205 may store data 207 and one or more modules 209. The base station 101 may include a transceiver for transmitting/receiving data to/from a UE.

In an embodiment, the data 207 may be stored in the memory 205 may include, without limitation, one or more data packets 211, a predefined order 213, a Channel Quality Indicator (CQI) 215, Downlink Control Information (DCI) 217 and other data 219. In some implementations, the data 207 may be stored within the memory 205 in the form of various data structures. Additionally, the data 207 may be organized using data models, such as relational or hierarchical data models. The other data 219 may include various temporary data and files generated by the one or more modules 209.

In an embodiment, the one or more data packets 211 may be the units of data that is converted into packages and being exchanged between the base station and the UE 103 using a network path and/or a telecommunication network. In an embodiment, a plurality of search spaces may be configured within a bandwidth of the channel used for sending the data packets to the UE.

In an embodiment, the predefined order 213 may be the order used for arranging the plurality of search spaces by the base station. The predefined order 213 may include a first end and a second end. The first end may have higher number of candidates with lower aggregation levels. The second end may comprise search space set having higher number of candidates with higher aggregation levels. In an embodiment, the aggregation levels of each of the plurality of PDCCH candidates may indicate a number of Control Channel Elements (CCEs) allocated for each of the plurality of PDCCH candidates.

In an embodiment, the Channel Quality Indicator (CQI) 215 is a quality indicator value defined according to Third-Generation Partnership Project (3GPP). For example, the UE 103 can report a CQI 215 value between 1 to 15, where 1 indicates worst channel quality/strength and 15 indicates the best value channel quality/strength. The threshold for determining the search order for the ordered multiple search space sets may be any value in this range of 1-15. As an example, the predetermined threshold CQI value may be a value around the middle of the range e.g., 7 or 8. Accordingly, when the reported CQI 215 is lower than this threshold, the base station may start searching for a free search space set from the end where there are search space sets with higher aggregation levels. Alternatively, if the reported CQI 215 value is higher than the threshold, then the base station may start searching from the end having search space sets with lower aggregation levels.

In an embodiment, the Downlink Control Information (DCI) 217 provides the UE 103 with the necessary information such as physical layer resource allocation, power control commands, HARQ information for both uplink and downlink. The DCI 217 may be transmitted on the Physical Downlink Control Channel (PDCCH) with a 24-bit Cyclic Redundancy Check (CRC) attachment.

In an embodiment, the data 207 may be processed by the one or more modules 209 of the base station 101. In various embodiments, the one or more modules 209 may be communicatively coupled to the processor 203 for performing one or more functions of the base station 101. In an implementation, the one or more modules 209 may include, without limiting to, a configuring module 221, an ordering module 223, a receiving module 225, a determining module 227, a selection module 229 and other modules 231. Each of the modules may include various processing circuitry and/or executable program instructions.

As used herein, the term module may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an implementation, each of the one or more modules 209 may be configured as stand-alone hardware computing units. In an embodiment, the other modules 231 may be used to perform various miscellaneous functionalities of the base station 101. It will be appreciated that such one or more modules 209 may be represented as a single module or a combination of different modules.

In an embodiment, the configuring module 221 may be configured for configuring the plurality of search spaces within the bandwidth of a channel used for sending data packets 211 to a User Equipment (UE) 103. In an embodiment, the ordering module 223 may be configured for ordering the plurality of search spaces in the predefined order 213. In an embodiment, the receiving module 223 may be configured for receiving the Channel Quality Indicator (CQI) 215 value corresponding to the channel from the UE 103. In an embodiment, the determining module 227 may be configured for determining an order for selecting one of the pluralities of search space set for sending a Downlink Control Information (DCI) 217 required for decoding the PDCCH to the UE 103 based on the CQI 215 value. In an embodiment, the selecting module 229 may be configured for selecting an available search space set among determined one of the pluralities of search space set for transmitting the DCI 217 to the UE 103.

Figure 2B:
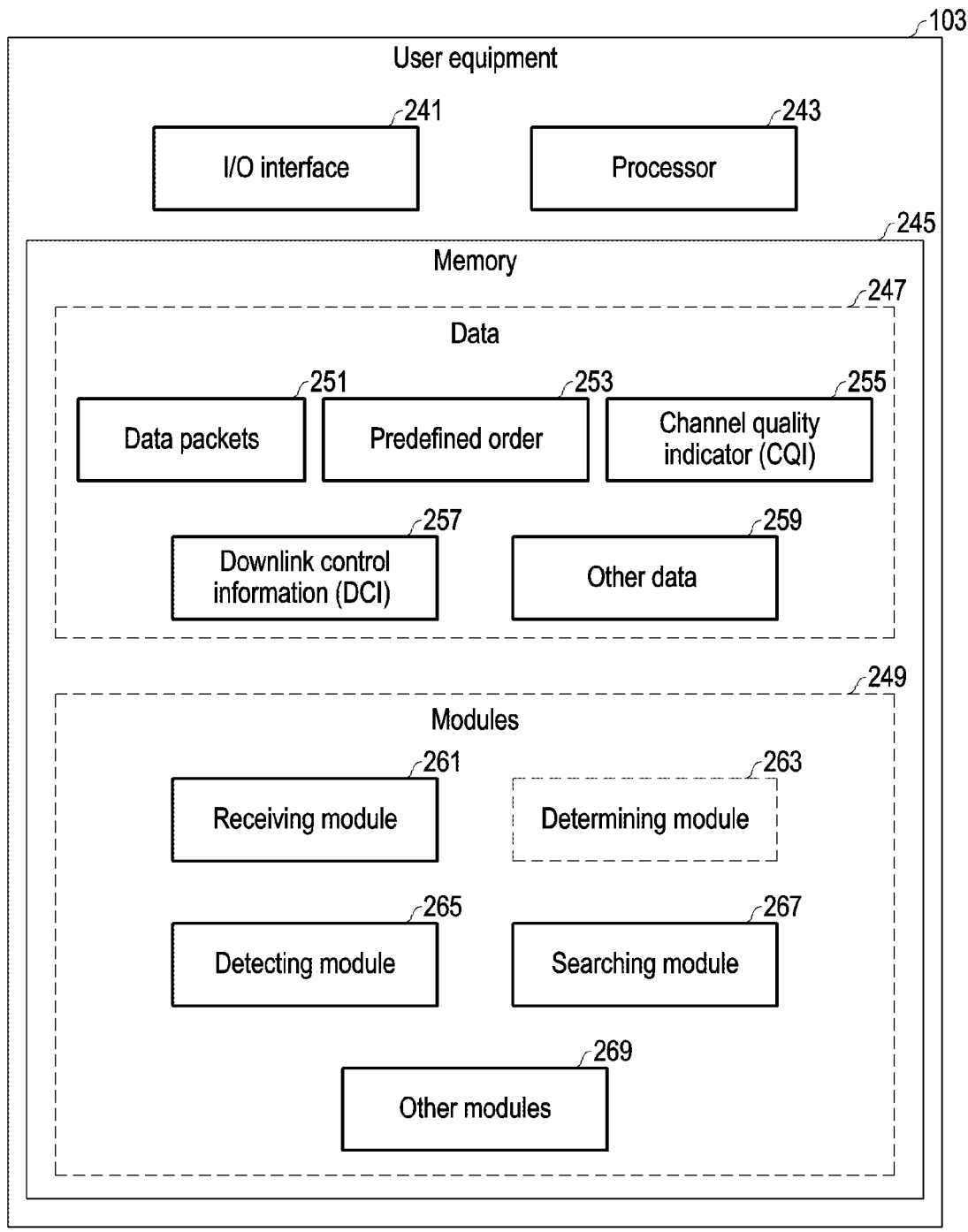
FIG. 2B is a block diagram illustrating an example configuration of a UE, according to various embodiments.

FIG. 2B is a block diagram illustrating an example configuration of a user equipment according to various embodiments.

In an embodiment, the User Equipment (UE) 103 may include an I/O interface (e.g., including I/O circuitry) 241, a processor (e.g., including processing circuitry) 243 and a memory 245. The I/O interface 241 may be used for receiving one or more user inputs from a user of the UE 103. The memory 245 may be communicatively coupled to the processor 243.

In an embodiment, the memory 245 may store data 247 and one or more modules (e.g., including various processing circuitry and/or executable program instructions) 249. The processor 243 may be configured to perform one or more functions of the UE 103 using the data 247 and the one or more modules 249. The UE 103 may include a transceiver for transmitting/receiving data to/from the base station.

In an embodiment, the data 247 stored in the memory 245 may include, without limitation, one or more data packets 251, a predefined order 253, a Channel Quality Indicator (CQI) 255, Downlink Control Information (DCI) 257 and other data 259. In some implementations, the data 247 may be stored within the memory 245 in the form of various data structures. Additionally, the data 247 may be organized using data models, such as relational or hierarchical data models. The other data 259 may include various temporary data and files generated by the one or more modules 249 while performing various functions of the UE 103.

In an embodiment, the one or more data packets 251 may be a unit of data that is made into a single package and exchanged between the base station 101 and the UE 103. In an embodiment, the predefined order 253 may be the ordering in which the plurality of search spaces is arranged by the base station. In an embodiment, the Channel Quality Indicator (CQI) 255 may indicate the quality of the channel connecting the UE to the base station. In an embodiment, the Downlink Control Information (DCI) 257 may indicate the UE 103 with the necessary information such as physical layer resource allocation, power control commands, HARQ information for both uplink and downlink. The DCI 217 may be transmitted on the Physical Downlink Control Channel (PDCCH) with a 24-bit Cyclic Redundancy Check (CRC) attachment.

In an embodiment, the data 247 may be processed by the one or more modules 249 of the UE 103. In some implementations, the one or more modules 249 may be communicatively coupled to the processor 243 for performing one or more functions of the UE 103. In an implementation, the one or more modules 249 may include, without limiting to, a receiving module 261, a determining module 263, a detecting module 265, a searching module 267 and other modules 269, each of which may include various processing circuitry and/or executable program instructions.

As used herein, the term module may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an implementation, each of the one or more modules 249 may be configured as stand-alone hardware computing units. In an embodiment, the other modules 269 may be used to perform various miscellaneous functionalities of the UE 103. It will be appreciated that such one or more modules 249 may be represented as a single module or a combination of different modules.

In an embodiment, the receiving module 261 may be configured for receiving the configuration of a plurality of search spaces within bandwidth of a channel used for receiving data packets 251 from a base station. In an embodiment, the determining module 263 may be configured for determining the Channel Quality Indicator (CQI) 255 value corresponding to the channel and transmitting the CQI 255 value to the base station. In an embodiment, the detecting module 265 may be configured for detecting the Downlink Control Information (DCI) 257 value received from the base station 101. In an embodiment, the searching module 267 may be configured for searching the plurality of search spaces.

Figure 3A:
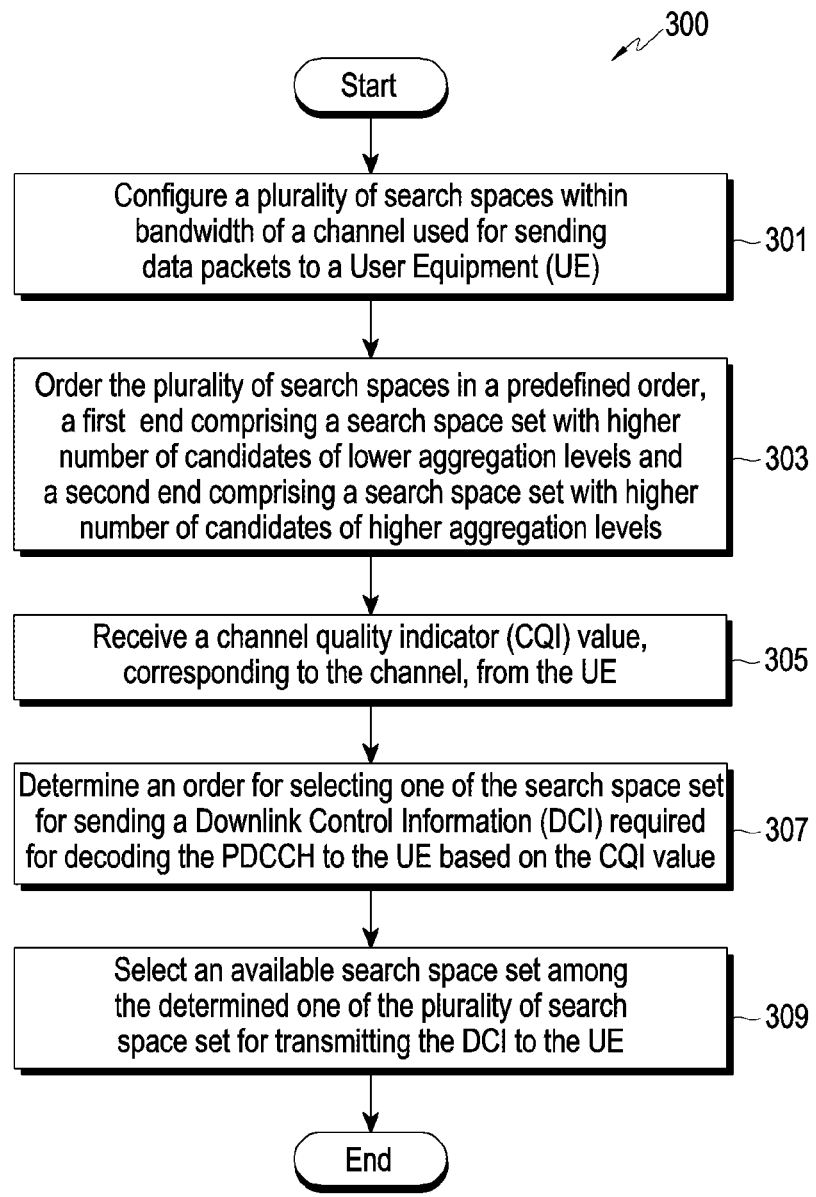
FIG. 3A is a flowchart illustrating an example method of optimizing Physical Downlink Control Channel (PDCCH) decoding in a 5G telecommunication network at a base station, according to various embodiments.

FIG. 3A is a flowchart illustrating an example method for optimizing Physical Downlink Control Channel (PDCCH) decoding in a 5G telecommunication network, at base station, according to various embodiments.

As illustrated in FIG. 3A, the method 300 may include one or more blocks illustrating various operations of a method for optimizing Physical Downlink Control Channel (PDCCH) decoding in a 5G telecommunication network using a base station 101 illustrated in FIG. 2A. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At 301, the method 300 includes configuring, by the base station 101, a plurality of search spaces within bandwidth of a channel used for sending data packets 211 to a User Equipment (UE) 103.

At 303, the method 300 includes ordering, by the base station 101, the plurality of search spaces in a predefined order, wherein a first end of the predefined order comprises a search space set having higher number of candidates with lower aggregation levels and a second end of the predefined order comprises a search space set having higher number of candidates with higher aggregation levels. In an embodiment, the aggregation levels of each of the plurality of PDCCH candidates indicates a number of Control Channel Elements (CCEs) allocated for each of the plurality of PDCCH candidates.

At 305, the method 300 includes receiving, by the base station 101, a Channel Quality Indicator (CQI) 107 value, corresponding to the channel. In an embodiment, the CQI 107 is a 3GPP defined value reported by the UE 103. For example, the UE 103 can report a CQI 107 value between 1 to 15 where 1 is the worst value and 15 is the best value. The threshold for determining the search order for the ordered multiple search space sets can be any value in this range. As an example, the predetermined threshold may be a value which is around the middle of the range e.g., 7 or 8. If the reported CQI 107 is lower than this, then the base station will start searching for a free search space set from the end where there are search space sets with higher aggregation levels. If the reported value is higher than this, then the base station will start searching from the end having search space sets with lower aggregation levels.

At 307, the method 300 includes determining, by the base station 101, an order for selecting one of the plurality of search space set for sending a Downlink Control Information (DCI), required for decoding the PDCCH, to the UE 103 based on the CQI 107 value. In an embodiment, selection of search space set order from the end having more candidates at higher aggregation levels to the end having more candidates at lower aggregation levels or vice versa.

At 309, the method 300 includes selecting, by the base station 101, an available search space set among determined one of the plurality of search space set for transmitting the DCI 109 to the UE 103.

Figure 3B:
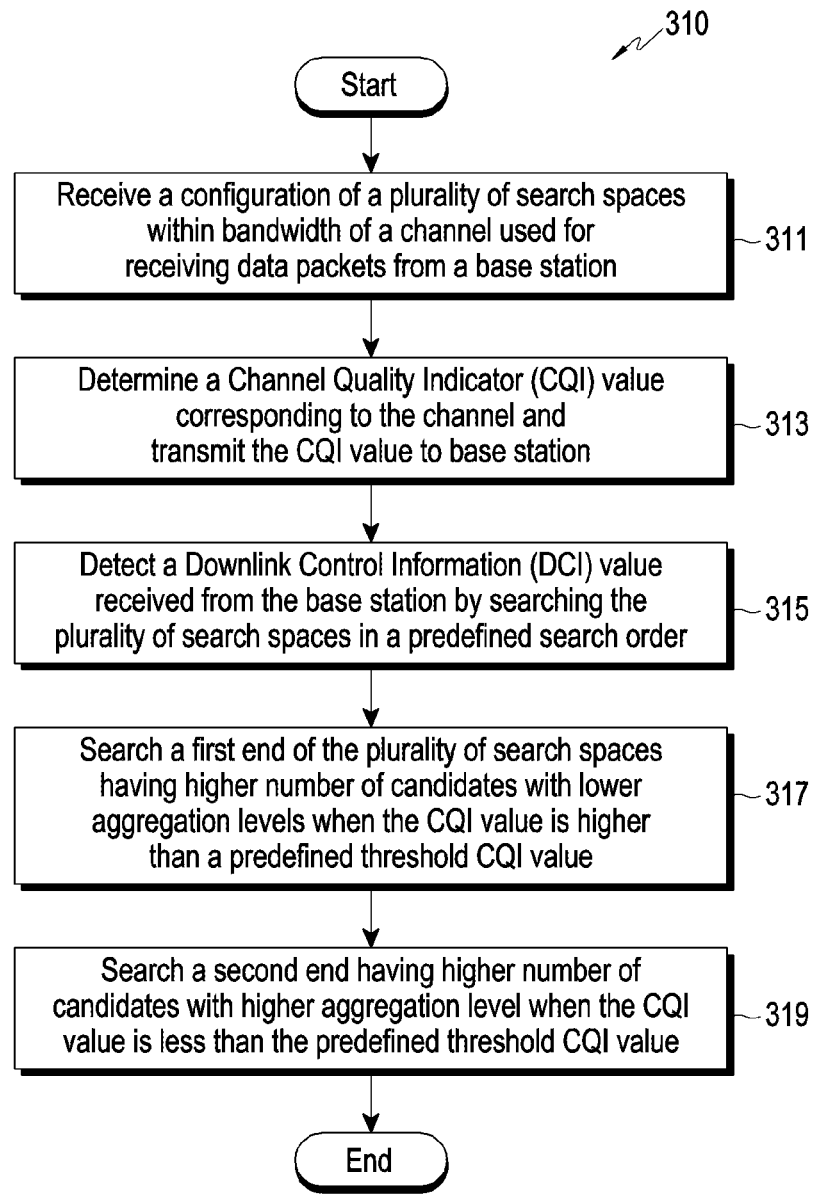
FIG. 3B is a flowchart illustrating an example method of optimizing Physical Downlink Control Channel (PDCCH) decoding in a 5G telecommunication network at a UE, according to various embodiments.

FIG. 3B is a flowchart illustrating an example method for optimizing Physical Downlink Control Channel (PDCCH) decoding in a 5G telecommunication network, at user equipment, according to various embodiments.

As illustrated in FIG. 3B, the method 310 may include one or more blocks illustrating various operations of a method for optimizing Physical Downlink Control Channel (PDCCH) decoding in a 5G telecommunication network using a UE 103 illustrated in FIG. 2B. The method 310 may be described in the general context of computer executable instructions. Generally, computer executable instructions can include routines, programs, objects, components, data structures, procedures, modules, and functions, which perform specific functions or implement specific abstract data types.

The order in which the method 310 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At 311, the method 310 includes receiving, by the User Equipment (UE) 103, a configuration of a plurality of search spaces within bandwidth of a channel used for receiving data packets from a base station. In an embodiment, the plurality of search spaces comprises information related to ordering of the plurality of search spaces such that one end contains search space set having high number of candidates with low aggregation level and other end contains search space set having high number of candidates with high aggregation level.

At 313, the method 310 includes determining, by the User Equipment (UE) 103, a Channel Quality Indicator (CQI) 107 value corresponding to the channel and transmitting the CQI 107 value to the base station. In an embodiment, the CQI 107 is a 3GPP defined value reported by the UE 103. For example, the UE 103 can report a CQI 107 value between 1 to 15, where 1 is the worst value and 15 is the best value.

At 315, the method 310 includes detecting, by the User Equipment (UE) 103, a Downlink Control Information (DCI) 109 value received from the base station by searching the plurality of search spaces in a predefined search order. In an embodiment, DCI 109 provides the UE 103 with the necessary information, such as physical layer resource allocation, power control commands, HARQ information for both uplink and downlink. The DCI 217 is transmitted on the Physical Downlink Control Channel (PDCCH) with a 24-bit Cyclic Redundancy Check (CRC) attachment.

At 317, the method 310 includes searching, by the User Equipment (UE) 103, a first end of the plurality of search spaces having higher number of candidates with lower aggregation levels when the CQI 107 value is higher than a predefined threshold CQI 107 value. In an embodiment, the aggregation levels of each of the plurality of PDCCH candidates indicates a number of Control Channel Elements (CCEs) allocated for each of the plurality of PDCCH candidates.

At 319, the method 310 includes selecting, by the User Equipment (UE) 103, a second end of the plurality of search spaces having higher number of candidates with higher aggregation levels when the CQI 107 value is less than the predefined threshold CQI 107 value. In an embodiment, the aggregation levels of each of the plurality of PDCCH candidates indicates a number of Control Channel Elements (CCEs) allocated for each of the plurality of PDCCH candidates.

Figure 4:
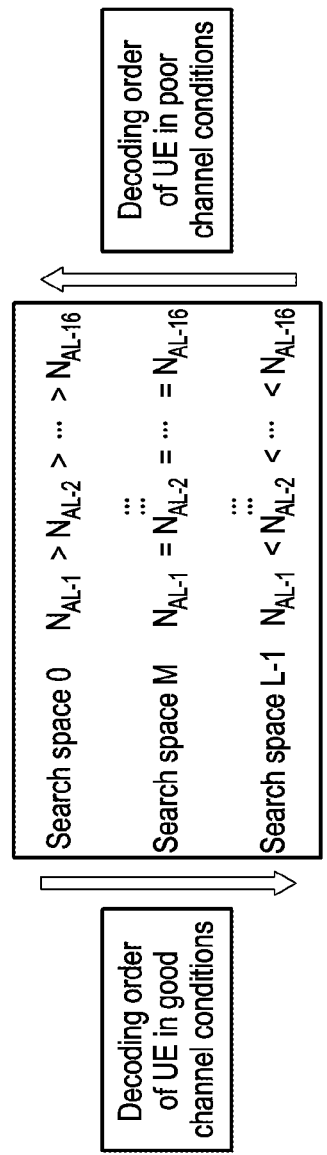
FIG. 4 is a diagram illustrating an example decoding order for a UE based on the channel conditions, according to various embodiments.

FIG. 4 is a diagram illustrating an example decoding order of the UE based on channel conditions, according to various embodiments.

In an embodiment, where there are 'L' number of search space sets ranging from 0 to L-1, and each search space set comprises multiple aggregation levels with their corresponding 'N' PDCCH candidates, which may be represented as ($N_{AL-1} > N_{AL-2} > \ldots > N_{AL-16}$). Here, a condition may be checked to understand if the channel conditions are good or poor. If the channel conditions, based on the CQI 107, are determined to be "good", then the UE 103 performs the blind detection of candidates from the search space set 0 to L-1. Similarly, if the channel conditions based on the CQI 107 are determined to be "poor", then the UE 103 performs the blind detection of candidates from the search space set L-1 to 0. Thereafter, the UE 103 detects the DCI 109 from the ordered search space set in a determined order, which optimizes decoding cycle and finally saves/reduces the power consumption, processing power and processing time of the UE 103.

Figure 5:
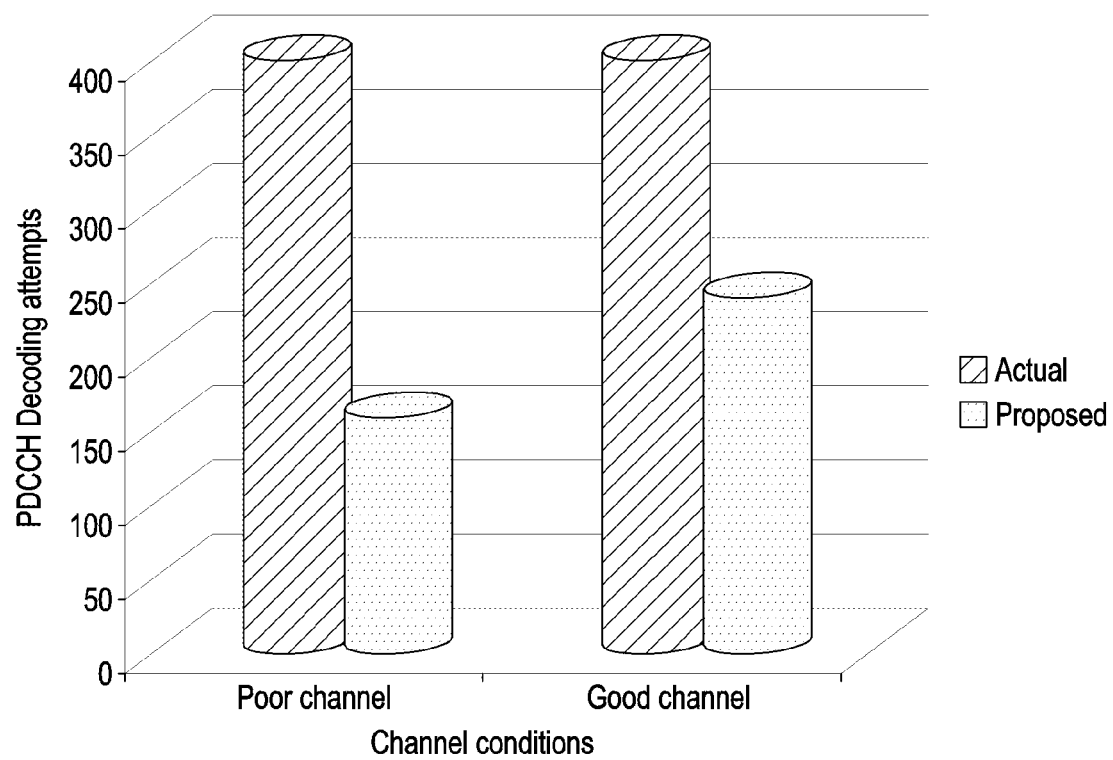
FIG. 5 is a graph illustrating simulation results obtained by comparing performance of a conventional PDCCH decoding with the disclosed PDCCH decoding method in 5G systems, according to various embodiments.

FIG. 5 is a graph illustrating example simulation results obtained by comparing performance of a conventional PDCCH decoding with the disclosed method for PDCCH decoding in 5G systems, according to various embodiments.

In an embodiment, the simulation result may be represented in the form a bar-graph where the results are measured in terms of the number of attempts made by the UE 103 for decoding the PDCCH information during the poor and the good channel conditions. The parameters considered during the simulation are given in the below Table 1.

TABLE 1

| Parameters | Value |
| --- | --- |
| Bandwidth | 20 MHz/96 RBs |
| Aggregation Level | 1, 2, 4, 8, 16, 32 |
| Number of search space configured | 20 |

TABLE 1-continued

| Parameters | Value |
| --- | --- |
| Number of candidates per search space | 40 |
| Number of CCE/CORESET | 96 |

It is observed that the disclosed method provides a better performance in terms of the decoding attempts of various channel conditions. In the present disclosure, it can be seen that the number of attempts made by the UE 103 is lower, both during poor and good channel conditions, when compared to the conventional decoding method. The method disclosed in the present disclosure works better when more search spaces are configured. Also, it can be concluded from the simulation that the disclosed method is suitable for saving processing cycles at the UE 103, so that the power consumption by the UE 103 can be reduced.

FIG. 6 is a diagram illustrating an example of ordered combination of aggregation levels and corresponding PDCCH candidates for multiple search space sets, according to various embodiments.

In an embodiment, FIG. 6 provides an example of ordering the search space sets comprising the aggregation levels with their corresponding PDCCH candidates based on the obtained CQI value. Each of the search space set is assigned with a Search Space ID (SS ID). As an example, suppose, a cell in the 5G system is configured with 1 CORESET which further includes 4 search space sets e.g., SS1, SS2, SS3 and SS4. The PDCCH candidates are configured per aggregation level in each of the search space SS1 to SS4. If the determined value of CQI 107 is greater than the threshold value (that is if the CQI 107 has a good quality), then the order of the search space set may be SS4-SS3-SS2-SS1, that is, from lower aggregation levels towards the higher aggregation levels. If the determined value of CQI 107 is less than the threshold value (that is if the CQI 107 has poor quality), then the order of search space sets may be SS1-SS2-SS3-SS4, that is, from the higher aggregation levels towards the lower aggregation levels.

Computer System

Figure 7:
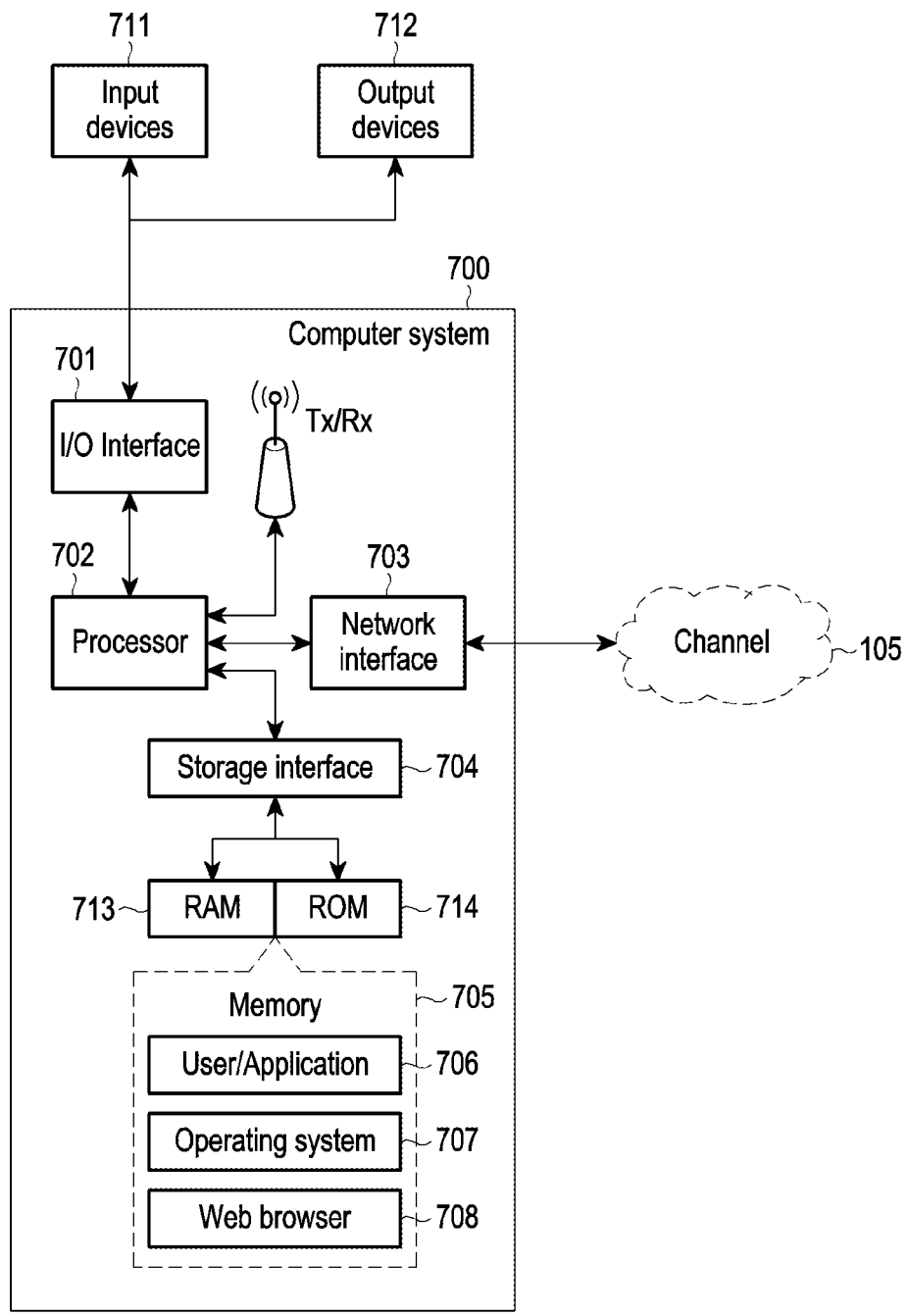
FIG. 7 is a block diagram illustrating an example configuration of a computer system according to various embodiments.

FIG. 7 is a block diagram illustrating an example configuration of a computer system 700 according to various embodiments. In an embodiment, the computer system 700 may be the base station 101 and/or a User Equipment (UE) illustrated in FIG. 1A, which may be suitably configured for optimizing Physical Downlink Control Channel (PDCCH) decoding in a 5G telecommunication network. The computer system 700 may include a central processing unit ("CPU" or "processor" or "memory controller") 702. The processor 702 may comprise at least one data processor for executing program components for executing user- or system-generated business processes. A user may include a network manager, a service provide, a user of the UE, application developer, a programmer, an organization or any system/sub-system being operated parallelly to the computer system 700. The processor 702 may include specialized processing units such as integrated system (bus) controllers, memory controllers/memory management control units, floating point units, graphics processing units, digital signal processing units, etc.

The processor 702 may be disposed in communication with one or more Input/Output (I/O) devices (711 and 712) via I/O interface (e.g., including I/O circuitry) 701. The I/O interface 701 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 701, the computer system 700 may communicate with one or more I/O devices 711 and 712.

In various embodiments, the processor 702 may be disposed in communication with a channel 105 via a network interface 703. The network interface 703 may communicate with the channel 105. The network interface 703 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc.

In an example, the communication network 709 may be implemented as one of the several types of networks, such as intranet or Local Area Network (LAN) and such within the organization. The channel 105 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP) etc., to communicate with each other. Further, the channel 105 may include a variety of network devices, including routers, bridges, servers, computing devices, storage devices, etc.

In various embodiments, the processor 702 may be disposed in communication with a memory 705 (e.g., RAM 713, ROM 714, etc. as shown in FIG. 7) via a storage interface 704. The storage interface 704 may connect to memory 705 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user/application interface 706, an operating system 707, a web browser 708, and the like. In various embodiments, computer system 700 may store user/application data 706, such as the data, variables, records, etc. as described in this disclosure. Such databases may be implemented as fault-tolerant, relational, scalable, secure databases such as Oracle® or Sybase®.

The operating system 707 may facilitate resource management and operation of the computer system 700. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 706 may include various interface circuitry and facilitate display, execution, interaction, manipulation, or operation of program components through textual or graphical facilities. For example, the user interface 706 may provide computer interaction interface elements on a display system operatively connected to the computer system 700, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 708 may be a hypertext viewing application. Secure web browsing may be provided using Secure Hypertext Transport Protocol (HTTPS), Secure Sockets Layer (SSL), Transport Layer Security (TLS), and the like. The web browsers 708 may utilize facilities such as AJAX, DHTML, ADOBE® FLASH®, JAVASCRIPT®, JAVA®, Application Programming Interfaces (APIs), and the like. Further, the computer system 700 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In various embodiments, the computer system 700 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

In an embodiment, the method of present disclosure helps in achieving high success rate in PDCCH decoding.

In an embodiment, the method of present disclosure helps in significant power saving at UE due to detection of PDCCH information in short time, thereby improving the battery life of the UE.

In an embodiment, the method of the present disclosure helps in providing an optimized decoding strategy which ensures success in a system configured with multiple search space sets.

In an embodiment, the method of the present disclosure helps in providing an efficient mechanism which helps in reducing both the time and complexity per slot, thereby reducing network latency and improving battery life of the UE.

In an embodiment, the method of the present disclosure helps in ensuring that a single combination of search space set can be used for a category of UEs experiencing similar conditions, for example cell center/cell edge, high speed/vehicular/pedestrian. The UEs of the same category are likely to experience similar conditions and would therefore have the same nature of aggregation level requirements. In such cases, a single search space set combination (for example cell edge UEs are more likely to experience a poor Signal-to-Interference-plus-Noise Ratio (SINR)/CQI and thereby needs more candidates at higher aggregation levels. Therefore, a search space set for such a UE would configure more number of higher aggregation level candidates across multiple search space sets) is likely to offer more candidates for PDCCH encoding at gNB/base station and therefore, a higher success rate of PDCCH allocation.

As stated above, it shall be noted that the method of the present disclosure may be used to address various technical problems related to decoding PDCCH in the 5G telecommunication systems. In other words, the disclosed method has a practical application and provide a technically advanced solution to the technical problems associated with the existing 5G telecommunication systems.

In light of the technical advancements provided by the disclosed method, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" may refer, for example, to "one or more (but not all) embodiments of the disclosure(s)" unless expressly specified otherwise.

The terms "including", "comprising", "having" and variations thereof may refer to "including but not limited to", unless expressly specified otherwise.

The enumerated listing of items does not imply that any or all the items are mutually exclusive, unless expressly specified otherwise. The terms "a", "an" and "the" may refer, for example, to "one or more", unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of disclosure need not include the device itself.

The language used in the disclosure has been principally selected for readability and instructional purposes, and it may not have been selected to delineate or circumscribe the disclosed subject matter. It is therefore intended that the scope of the disclosure be limited not by this detailed description. Accordingly, the embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. In other words, while the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for optimizing physical downlink control channel (PDCCH) decoding by a base station in a wireless communication system, the method comprising:
    transmitting configuration information including information about a plurality of search space sets within a bandwidth of a channel used for transmitting data packets to a user equipment (UE);
    ordering the plurality of search space sets in a specified order for the plurality of search space sets based on a number of PDCCH candidates per aggregation level in each search space set;
    receiving a channel quality indicator (CQI) value, corresponding to the channel, from the UE;
    determining an order for selecting one of the plurality of search space sets for transmitting downlink control information (DCI) required for decoding a PDCCH to the UE based on the CQI value; and
    selecting, based on the determined order, an available search space set among the plurality of search space sets for transmitting the DCI to the UE.

2. The method of claim 1, wherein the specified order comprises at least one of a first end in which a search space set having higher number of PDCCH candidates with lower aggregation levels and a second end of the specified order comprises a search space set having higher number of PDCCH candidates with higher aggregation levels.

3. The method of claim 1, wherein the plurality of search space sets are ordered in the specified order where the number of PDCCH candidates per the aggregation level is allocated more to lower aggregation levels for a channel condition based on the CQI value being greater than a predefined threshold CQI value.

4. The method of claim 1, wherein the plurality of search space sets are ordered in the specified order based on the number of PDCCH candidates per the aggregation level being allocated more to higher aggregation levels for a channel condition based on the CQI value being less than a specified threshold CQI value.

5. The method of claim 1, wherein the aggregation levels of each of the plurality of PDCCH candidates indicates a number of control channel elements (CCEs) allocated for each of the plurality of PDCCH candidates.

6. The method of claim 1, wherein the order for selecting one of the plurality of search space sets is determined by comparing the CQI value with a specified threshold CQI value.

7. A method for optimizing physical downlink control channel (PDCCH) decoding by a user equipment (UE) in a wireless communication system, the method comprising:
receiving configuration information including information about a plurality of search space sets within a bandwidth of a channel used for receiving data packets from a base station;
determining a channel quality indicator (CQI) value corresponding to the channel and transmitting the CQI value to the base station;
searching the plurality of search space sets in a specified order configured based on a number of PDCCH candidates per aggregation level in each search space set; and
detecting downlink control information (DCI) on a PDCCH by the searching,
wherein searching the plurality of search space sets in a specified search order, comprises at least one of:
searching a first search space set having higher number of candidates with lower aggregation levels based on the COI value being greater than a threshold CQI value; or
searching a second search space set having higher number of candidates with higher aggregation levels based on the COI value being less than the threshold COI value.

8. The method of claim 7, wherein the plurality of search space sets are ordered in the specified order based on the number of PDCCH candidates per the aggregation level being allocated more to lower aggregation levels for a channel condition in case that on the CQI value is greater than the threshold CQI value.

9. The method of claim 7, wherein the plurality of search space sets are ordered in the specified order based on the number of PDCCH candidates per the aggregation level being allocated more to higher aggregation levels for a channel condition in case that the CQI value being is than the threshold CQI value.

10. The method of claim 7, wherein the aggregation levels of each of the plurality of PDCCH candidates indicates a number of control channel elements (CCEs) allocated for each of the plurality of PDCCH candidates.

11. A base station in a wireless communication system, the base station comprising:
a transceiver; and
a processor configured to:
transmit, through the transceiver, configuration information including information about a plurality of search space sets within a bandwidth of a channel used for transmitting data packets to a user equipment (UE),
order the plurality of search space sets in a specified order for the plurality of search space sets based on a number of physical downlink control channel (PDCCH) candidates per aggregation level in each search space set,
receive, through the transceiver, a channel quality indicator (CQI) value, corresponding to the channel, from the UE,
determine an order for selecting one of the plurality of search space sets for transmitting downlink control information (DCI) required for decoding a PDCCH to the UE based on the CQI value, and
selecting, based on the determined order, an available search space set among the plurality of search space sets for transmitting the DCI to the UE.

12. The base station of claim 11, wherein the specified order comprises at least one of a first end in which a search space set having higher number of PDCCH candidates with lower aggregation levels and a second end of the specified order comprises a search space set having higher number of PDCCH candidates with higher aggregation levels.

13. The base station of claim 11, wherein the processor is configured to: order the plurality of search space sets in the specified order based on the number of PDCCH candidates per the aggregation level being allocated more to lower aggregation levels for a channel condition based on the CQI value being greater than a specified threshold CQI value.

14. The base station of claim 11, wherein the processor is configured to: order the plurality of search space sets in the specified order based on the number of PDCCH candidates per the aggregation level being allocated more to higher aggregation levels for a channel condition based on the CQI value being less than a predefined threshold CQI value.

15. The base station of claim 11, wherein the aggregation levels of each of the plurality of PDCCH candidates indicates a number of control channel elements (CCEs) allocated for each of the plurality of PDCCH candidates.

16. A user equipment (UE) in a wireless communication system, the UE comprising:
a transceiver; and
a processor configured to:
receive, through the transceiver, configuration information including information about a plurality of search space sets within a bandwidth of a channel used for receiving data packets from a base station,
determine a channel quality indicator (CQI) value corresponding to the channel and transmitting the CQI value to the base station,
search the plurality of search space sets in a specified order configured based on a number of PDCCH candidates per aggregation level in each search space set, and
detect downlink control information (DCI) on a PDCCH by the searching,
wherein the processor is further configured to perform at least one of:
searching a first search space set having higher number of candidates with lower aggregation levels in case that the COI value is greater than a threshold COI value, or
searching a second search space set having higher number of candidates with higher aggregation levels in case that the COI value is less than the threshold CQI value.

17. The UE of claim 16, wherein the plurality of search space sets are ordered in the specified order based on the number of PDCCH candidates per the aggregation level being allocated more to lower aggregation levels for a channel condition in case that the CQI value is greater than the threshold CQI value, and
wherein the plurality of search space sets are ordered in the specified order based on the number of PDCCH candidates per the aggregation level being allocated more to higher aggregation levels for a channel condition in case that the CQI value is less than the threshold CQI value.

18. The UE of claim 16, wherein the aggregation level of each of the plurality of PDCCH candidates indicates a number of Control Channel Elements (CCEs) allocated for each of the plurality of PDCCH candidates.

\* \* \* \* \*